(12) United States Patent
Yoneda

(10) Patent No.: US 7,065,653 B1
(45) Date of Patent: Jun. 20, 2006

(54) INFORMATION RECORDING MEDIUM REPRODUCING METHOD, INFORMATION RECORDING MEDIUM, REPRODUCING APPARATUS AND INFORMATION MEDIUM MANAGING METHOD

(75) Inventor: Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 895 days.

(21) Appl. No.: 09/695,154

(22) Filed: Oct. 24, 2000

(30) Foreign Application Priority Data

Oct. 25, 1999 (JP) ................................ 11-301871

(51) Int. Cl.
*G06F 17/00* (2006.01)

(52) U.S. Cl. ...................... 713/193; 713/191; 713/189

(58) Field of Classification Search ........ 713/189–194, 713/200–202, 168, 176
See application file for complete search history.

(56) References Cited

U.S. PATENT DOCUMENTS

| | | | |
|---|---|---|---|
| 6,704,872 B1 * | 3/2004 | Okada .......................... | 713/194 |
| 6,708,212 B1 * | 3/2004 | Porras et al. ................ | 713/201 |

OTHER PUBLICATIONS www.microsoft.com/windowsmedia/WM7/DRM/FAQ.aspx.*
A two-layer cryptographic scheme for an e-service framework based on mobile agents; Wang, T.I.; Tsai, K.H.; Lee, M.-C.; e-Technology, e-Commerce and e-Service, 2004. EEE '04. 2004 IEEE International Conference on Mar. 28-31, 2004 pp. 98-105.*
Preserving integrity in remote file location and retrieval; Jaeger, T.; Rubin, A.D.; Network and Distributed System Security, 1996., Proceedings of the Symposium on Feb. 22-23, 1996 pp. 53-63.*
A two-layer crytographic scheme for an e-service framework based on mobile agents; Wang, T.I.; Tsai, K.H.; Lee, M.-C.; e-Technology, e-Commerce and e-Service, 2004. EEE '04. 2004 IEEE International Conference on Mar. 28-31, 2004 pp. 98-105.*

* cited by examiner

*Primary Examiner*—David Jung
(74) *Attorney, Agent, or Firm*—Oblon, Spivak, McClelland, Maier & Neustadt, P.C.

(57) ABSTRACT

In an information recording medium reproducing method, an information recording medium, a reproducing apparatus and an information recording medium managing method, a predetermined server is accessed on the basis of an address recorded in an information recording medium to issue key data from the server, and encrypted data recorded in the information recording medium are decrypted with the key data thus issued.

10 Claims, 7 Drawing Sheets

FIG. 3

| CONCERT DATA | | |
|---|---|---|
| MUSIC NUMBER DATA 1 | KEY DATA 1 | MUSIC TITLE 1 |
| MUSIC NUMBER DATA 2 | KEY DATA 2 | MUSIC TITLE 2 |
| MUSIC NUMBER DATA 3 | KEY DATA 3 | MUSIC TITLE 3 |
| ⁓ | ⁓ | ⁓ |
| MUSIC NUMBER DATA 10 | KEY DATA 10 | MUSIC TITLE 10 |

FIG. 4

CONCERT OPENING PLACE/DATE LIST

SEPTEMBER

| DAYS OF PUBLIC PERFORMANCE | PLACE | DOOR OPENING/ CURTAIN RAISING | REFERENCE |
|---|---|---|---|
| SEPTEMBER 2 (THURSDAY) | ○○○ CULTURAL CENTER | 18:00/18:30 | ○○○○○○ |
| SEPTEMBER 4 (SATURDAY) | ×× FESTIVAL HALL | 17:45/18:30 | ××××× |
| SEPTEMBER 5 (SUNDAY) | ○○ FESTIVAL HALL | 16:45/17:30 | ○○○○○○ |
| SEPTEMBER 10 (FRIDAY) | △△ SUN PALACE | 18:30/19:00 | △△△△△ |
| SEPTEMBER 11 (SATURDAY) | ○○ PREFECTURAL THEATER PLAY HALL | 18:00/18:30 | ○○○○○○ |
| ............... | ............... | ............... | ............... |

FIG. 5

MUSICAL PAROGRAM LIST OF CONCERT

LIST OF MUSICAL PROGRAM LIST IN 1999/09/05 ○○ FESTIVAL HALL

1. ○○○○ · · · [PURCHASE]
2. □□□□ · · · [PURCHASE]
3. ✳✳✳✳✳ · · · [PURCHASE]
4. △△△△△△△ · · · [PURCHASE]
5. ○○○○ · · · [PURCHASE]

· · · · · · · · · · · · · · ·

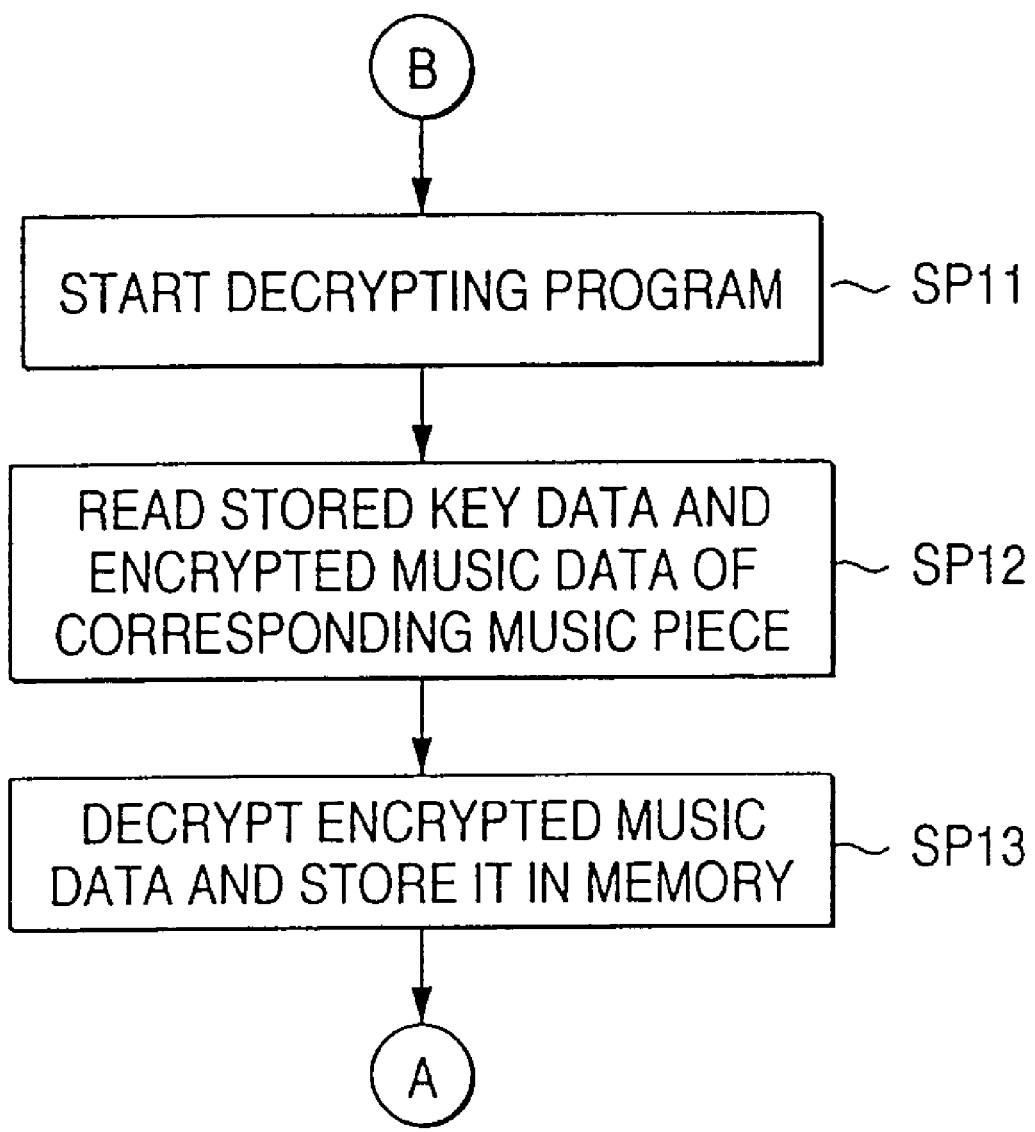

INFORMATION RECORDING MEDIUM REPRODUCING METHOD, INFORMATION RECORDING MEDIUM, REPRODUCING APPARATUS AND INFORMATION MEDIUM MANAGING METHOD

BACKGROUND OF THE INVENTION

1. Field of the Invention

The present invention relates to an information recording medium reproducing method, an information recording medium, a reproducing apparatus and an information recording medium managing method, and it is applicable to a system for reproducing an optical disc on which music pieces are recorded, for example. Further, the present invention aims to access a predetermined server on the basis of an address recorded on an information recording medium to issue key data from the server thereto and decrypt encrypted data recorded on the information recording medium, whereby an user can easily and accurately re-listening to a music piece to which the user test-listened and took a fancy at a concert opening place or the like.

2. Description of the Related Art

Music pieces have been hitherto supplied to users through media such as optical discs, etc. For example, a music album is created by collectively recording on optical discs a series of music pieces selected by an artist, a recording company or the like. Further, a single disc is created by selecting a desired music piece from a music album thus created and recording it on optical discs.

Recently, a new service of distributing music pieces through the Internet to users has been started. Further, there is such a case that a user wishes to re-listen to a favorite music piece to which the user test-listened at a concert opening place or the like. In this case, if the user purchases an album containing his/her favorite music piece to listen to the favorite music piece, the user must purchase undesired music pieces. Further, for users which hardly purchase these types of media, it is a very heavy work to look for albums containing target music pieces.

Further, it may be considered that a user purchase a single disc to test-listen to his/her favorite music piece. However, such a favorite music piece may not be supplied in the form of a single disc. As compared with the case of albums, it is a further heavier work for a user to look for a single disc containing his/her target music piece.

On the other hand, through the distribution of music pieces to uses through the Internet, the users can download and enjoy only their favorite music pieces through the Internet. In this case, however, each user must search a home page distributing his/her desired music piece from many home pages, and further select the desired music piece from many music pieces distributed from this home page, so that the user must carry out an extremely intricate work. Further, it takes much time to download the desired music piece.

SUMMARY OF THE INVENTION

The present invention has been implemented in view of the foregoing problems, and has an object to provide an information recording medium reproducing method, an information recording medium, a reproducing apparatus and an information recording medium managing method with which
a user can easily and accurately re-listen to a music piece to which the user test-listened and took a fancy at a concert opening place or the like.

According to a first aspect of the present invention, a method of reproducing an information recording medium on which encrypted data are recorded, is characterized by comprising the steps of: accessing a predetermined server on the basis of an address recorded on the information recording medium; and decrypting the encrypted data (releasing the encryption of the data) recorded on the information recording medium on the basis of key data issued from the server.

According to a second aspect of the present invention, an information recording medium is characterized in that encrypted data are recorded on the information recording medium so that the encrypted data can be decrypted on the basis of key data issued from a predetermined server, and an address required to access the server is recorded on the information recording medium.

According to a third aspect of the present invention, a reproducing apparatus for reproducing an information recording medium on which encrypted data are recorded, is characterized by comprising: access means for accessing a predetermined server on the basis of an address recorded on an information recording medium; and decrypting means for decrypting the encrypted data recorded on the information recording medium on the basis of key data issued form the server.

According to a fourth aspect of the present invention, an information recording medium managing method for managing an information recording medium on which encrypted data are recorded, is characterized in that key data for decrypting previously encrypted data are issued through an access based on an address recorded on the information recording medium.

According to the first aspect of the present invention, the predetermined server is accessed on the basis of the address recorded on the information recording medium and the encrypted data recorded on the information recording medium are decrypted with the key data issued from the server, whereby various kinds of encrypted data which are recorded and distributed on the information recording medium can be used with a simple operation. Accordingly, for example, an information recording medium such as an optical disc on which music pieces performed at a concert opening place or the like are encrypted and recorded is distributed, and a user can easily and accurately re-listen to a music piece which the user test-listened and took a fancy at the concert opening place or the like.

According to the second aspect of the present invention, the encrypted data are recorded on the information recording medium so that the encrypted data can be decrypted on the basis of the key data issued from the predetermined server, and the address required to access the server is also recorded on the information recording medium. Therefore, with respect to the encrypted data recorded on the information recording medium, the user can utilize the encrypted data by accessing the server easily as occasion demands. Accordingly, for example, an information recording medium such as an optical disc on which music pieces performed at a concert opening place or the like are encrypted and recorded is distributed, and a user can easily and accurately re-listen to a music piece which the user liked in the concert opening place or the like.

According to the third aspect of the present invention, the reproducing apparatus has the access means for accessing the predetermined server on the basis of the address recorded on the information recording medium, and the decrypting (encryption releasing) means for decrypting the encrypted data recorded on the information recording medium on the basis of the key data issued from the server. Therefore, by merely recording and distributing various encrypted data on an information recording medium, the data recorded on the information recording medium can be used with a simple operation. Accordingly, for example, an information recording medium such as an optical disc on which music pieces performed at a concert opening place or the like are encrypted and recorded is distributed, and a user can easily and accurately re-listen to a music piece which the user liked in the concert opening place or the like.

According to the fourth aspect of the present invention, the key data for decrypting previously encrypted data are issued through an access based on the address recorded on the information recording medium. Therefore, by merely recording and distributing various encrypted data on an information recording medium, the data recording on the information recording medium can be used with a simple operation. Accordingly, for example, an information recording medium such as an optical disc or the like on which music pieces performed at a concert opening place or the like are encrypted and recorded is distributed, and a user can easily and accurately re-listen to a music piece which the user liked in the concert opening place or the like.

BRIEF DESCRIPTION OF THE DRAWINGS

FIG. 3 is a table showing the content of disc data recorded in a data base in the music supply system 1 of FIG. 1;

FIG. 4 is a plan view showing a display of a concert program list constructed by the disc data of FIG. 3;

FIG. 5 is a plan view showing a display of a list of music titles constructed by the disc data of FIG. 3;

FIG. 7 is a flowchart showing the subsequent processing flow of FIG. 6.

DETAILED DESCRIPTION OF THE PREFERRED EMBODIMENT

A preferred embodiment according to the present invention will be described with reference to the accompanying drawings.

(1) Construction of Embodiment

Figure 1:
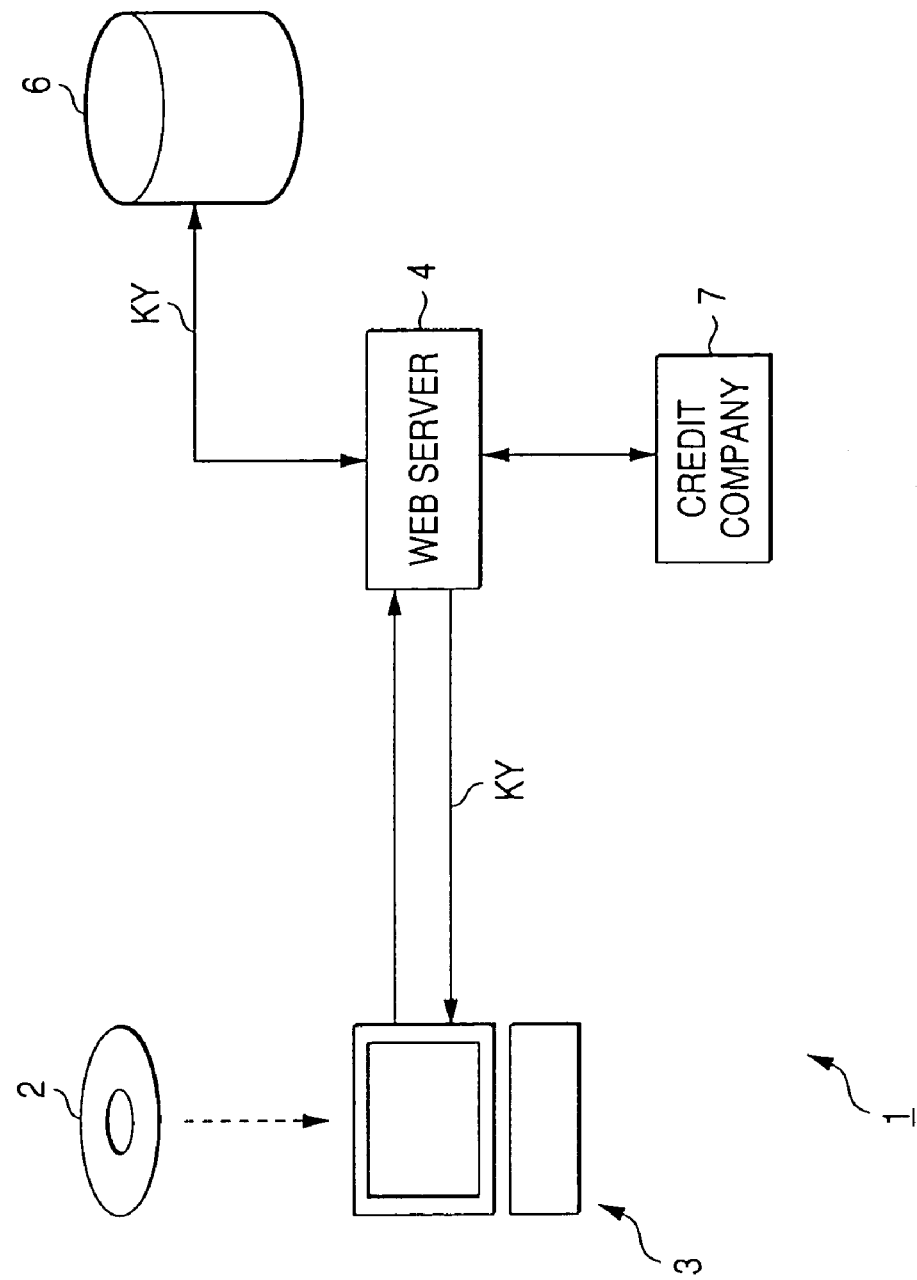
FIG. 1 is a block diagram showing a music supply system according to an embodiment of the present invention.

FIG. 1 is a block diagram showing a music supply system according to an embodiment of the present invention.

In the music supply system 1, music pieces performed at a concert opening place or the like are collectively recorded on compact discs 2 serving as information recording media and then these compact discs 2 are distributed to users. Each user can test-listen to his/her favorite music piece from the music pieces recorded on the compact disc 2 in accordance with a user's operation.

Figure 2:
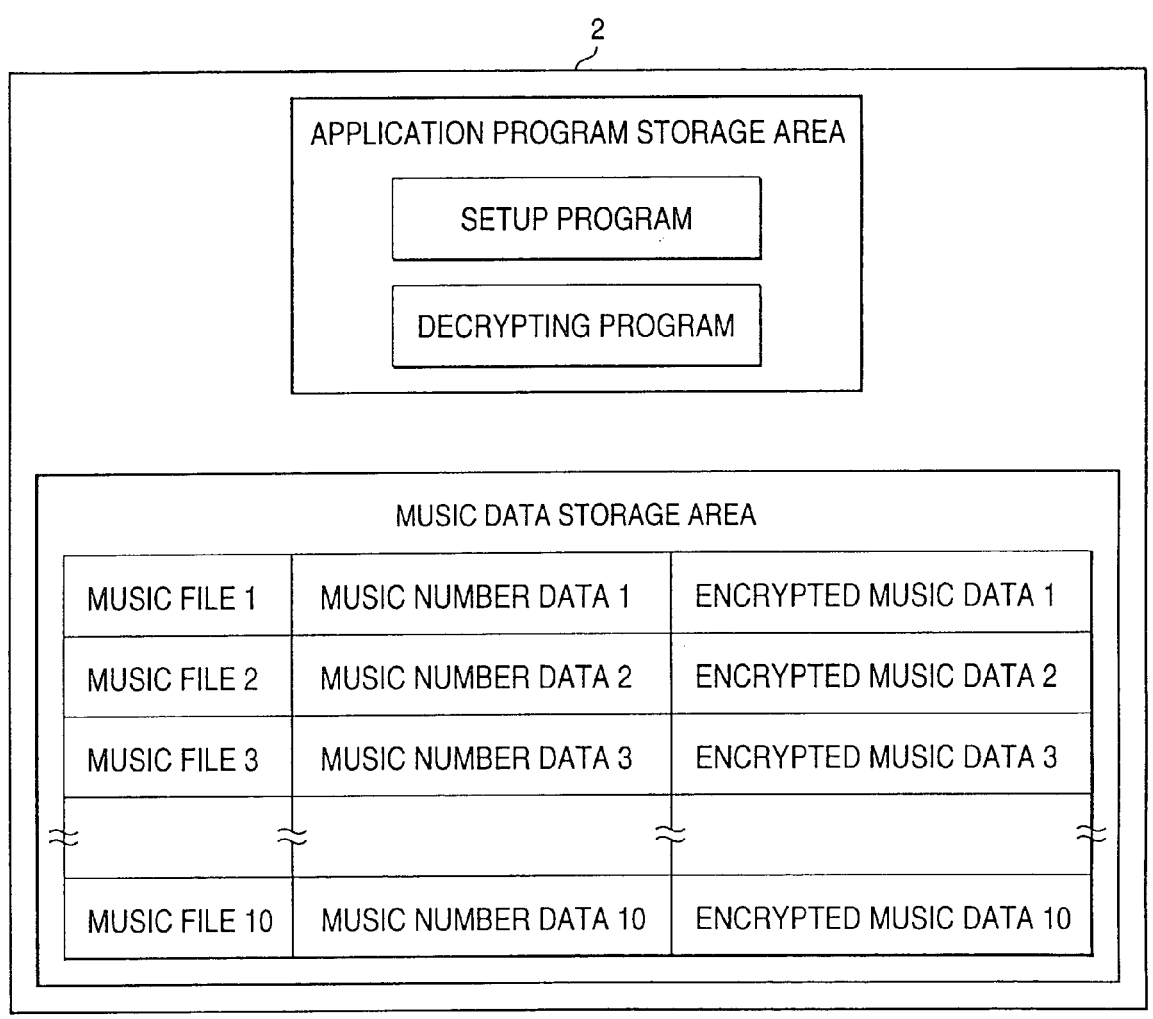
FIG. 2 is a table showing the content of a compact disc 2 in the music supply system 1 of FIG. 1.

As shown in FIG. 2, in the compact disc 2, the information recording face is divided into an application program storage area and a music data storage area, and a predetermined URL (Uniform Resource Locator), a setup program and a decrypting program are recorded in the application program storage area. URL is an address for specifying a server 4 described later and further specifies a home page on the compact disc 2 from each home page recorded in the data base 6.

The setup program is an application program for executing a series of processing as described later. Upon execution of this processing, the setup program starts a WWW (World Wide Web) browser to obtain key data from the predetermined server 4 and further operate a decrypting (encryption releasing) program. The setup program is set so as to automatically start when the compact disc 2 is loaded into the personal computer 3, whereby a user can test-listen to a music piece recorded on the compact disc 2 with a simple operation.

On the other hand, the decrypting (encryption releasing) program is an application program for decrypting the encrypted music data recorded in the music data storage area by using the key data.

That is, in the music data storage area are recorded a concert in which this compact disc is distributed, and music data for music pieces which are scheduled to be performed in this concert. The music data are created as follows: audio data are filed every music piece; the audio data thus filed are encrypted with key data for each music piece; and music number data serving as identification data for identifying each file are allocated to each file, and then the music data thus created are recorded in the music data storage area.

In the construction shown in FIG. 2, 10 music pieces are recorded in association with music files 1 to 10, and the respective music files 1 to 10 are specified with music number data 1 to 10.

In the music supply system 1, the personal computer 3 executes a series of processing steps according to a setup program recorded on the compact disc 2, and accesses the Web server 4 on the basis of URL recorded on the compact disc 2. Further, the personal computer 1 gets a home page on the compact disc 2 from the Web server 4 and displays it, and also it obtains key data KY for user's desired music data in accordance with the user's operation on the home page thus obtained. The personal computer 3 decrypts (releases the encryption of) the music data with the key data KY. When the personal computer 3 gets the key data KY, it executes charging processing through the data communication with the Web server 4.

In response to a request from the personal computer 3, the Web server 4 accesses the data base 6 and transmits the key data KY, etc. to the personal computer 3. The Web server 4 further accesses the server of a credit company 7 through a predetermined telephone line to execute the charging processing for the key data KY to be supplied to the personal computer 3.

The data base 6 is constructed so that the disc data are recorded in the data base 6 every compact disc managed by the data base 6. Each disc data can be specified on the basis of URL recorded on each compact disc. To the disc data are allocated concert data having information on a concert in which each compact disc 2 is distributed, key data required to decrypt (release the encryption of) each music data recorded on the compact disc 2, and the corresponding music number data and music title data as shown in 3.

Here, the concert data comprise data for specifying concert opening place, date, place, etc of the concert in which the compact disc 2 is distributed, data for specifying music pieces performed at each concert opening place in association with music number data, data representing the performance order of the music pieces in each concert, etc.

The disc data are described in the format of HTML (Hyper Text Makeup Language). When the personal computer 3 accesses the Web server 4 on the basis of URL recorded on the compact disc 2 to open the corresponding home page, a display frame as shown in FIG. 4 is displayed on the screen of the personal computer 3 so that the user can check a list of the concerts in which the compact disc 2 is distributed. Further, by tracing links set on a display of any concert of the list through the personal computer 3, a display frame as shown in FIG. 5 is obtained, whereby the user can check a list of music titles performed in the concert concerned in the performance order.

A "purchase" menu is displayed for each music title, and a predetermined charging processing home page can be accessed by selecting this menu.

Accordingly, at the Web server 4 side, the charging processing is executed in response to a user's operation carried out on the displayed home page for the music title list in the personal computer 3, and further when the correct charging processing is executed, the key data KY corresponding to the display of a desired music title is transmitted on the basis of the music number data thereof to the personal computer 3.

Figure 6:
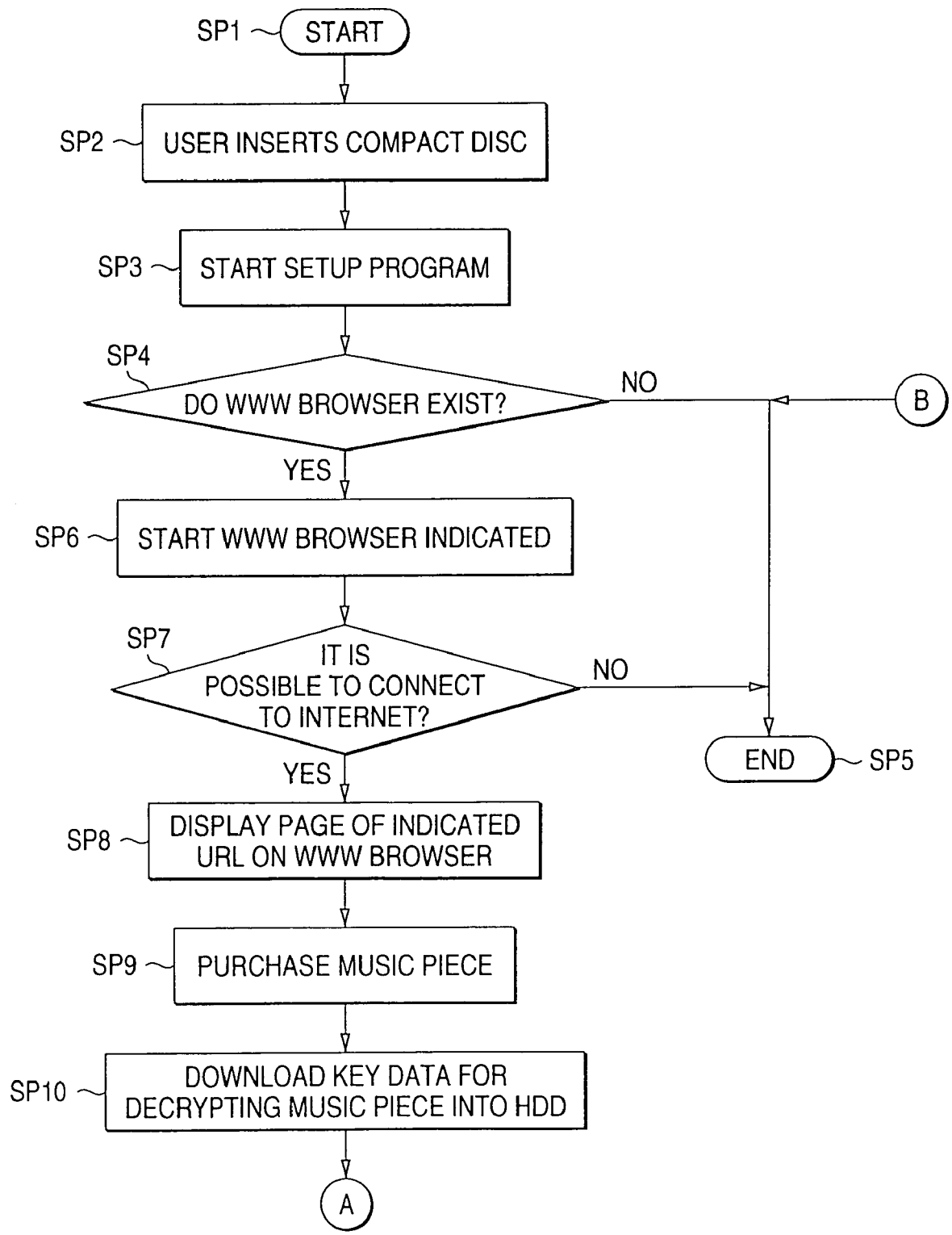
FIG. 6 is a flowchart showing the processing flow of a personal computer of FIG. 1.

FIGS. 6 and 7 are flowcharts showing the processing steps of the personal computer 3 which are executed on the basis of the setup program recorded on the compact disc 2.

After the power is turned on, the personal computer 3 shifts the processing from step SP1 to step SP2 and waits until the compact disc 2 is loaded by the user. When the compact disc 2 is loaded, the personal computer 3 shifts the processing to step SP3 to start the setup program, and the processing is shifted to step SP4 by the setup program.

In the step SP4, the personal computer 3 judges whether a WWW browser serving as a reading software for the Internet exists or not. If a negative judgment is obtained, the processing is shifted to step SP5 to finish the processing.

On the other hand, if the WWW browser exits, a positive result is obtained in the step SP4, and the personal computer 3 shifts the processing to step SP6 to start the WWW browser. At this time, the personal computer 3 starts the WWW browser on the basis of URL recorded on the compact disc 2.

Subsequently, the personal computer 3 shifts the processing to step SP7 to judge whether it can be connected to the Internet. Here, for example when it is difficult for the personal computer to connect to the Internet because no modem is mounted or the like, the negative result is obtained in the step SP7 in the personal computer 3, and thus the personal computer 3 shifts the processing to step SP5 to finish this processing.

On the other hand, if the personal computer can be connected to the Internet, the positive result is obtained in the step SP7 and thus the personal computer 3 shifts the processing to step SP8 to display the home page based on the indicated URL with the WWW browser, whereby the personal computer 3 can access the server 4 on the basis of the address recorded on the compact disc 2 and further access the data base 6, and open the home page (FIG. 4) corresponding to the compact disc 2.

When the user selects any one of the concerts displayed on the home page, the personal computer 3 switches the display thereof while tracing the link to the concert through the processing of the WWW browser, and displays the list of the music tiles as shown in FIG. 5.

When the user selects the purchase menu on the display of the list, the personal computer 3 shifts the processing to step SP9 to trace the link set on this menu and displays a menu frame for charging processing. Here, when the user inputs data required for the charging processing such as a user's name, a password, a credit card number, etc. and then operates a predetermined menu, the personal computer 3 transmits these data to the Web server 4, whereby the charging processing is executed by the Web server 4 in the music supply system 1.

When the charging processing as described is normally completed, the personal computer 3 shifts the processing to step SP10 to download from the server 4 the key data KY corresponding to the music title on which the charging processing has been carried out, and stores the key data KY into a built-in hard disc device.

Subsequently, the personal computer 3 shifts the processing to step SP11 (FIG. 7) to start the decrypting program (encryption releasing program). In the subsequent SP12, the key data KP stored is read out and delivered to the decrypting program. Further, on the basis of the music number data of this key data KY, the corresponding music data are reproduced from the compact disc and delivered to the decrypting program.

Subsequently, in step SP12 the personal computer 3 executes the decrypting program to decrypt the music data, and stores the audio data thus obtained into the hard disc device. Thereafter, the personal computer 3 returns its processing to step SP5 to finish this processing.

Accordingly, in the personal computer 3, the audio data thus recorded in the hard disc device can be reproduced with a desired application program.

(2) The Operation of the Embodiment

In the music supply system 1 thus constructed (FIG. 1), the audio data of music pieces which are scheduled to be performed by respective artists in a concert are encrypted in advance and recorded together with a setup program, a decrypting program, etc. to thereby form compact discs 2 (FIG. 2).

Further, the data of a list of concerts (FIG. 4) in which the compact discs 2 thus created are distributed and the data of a list of music titles (FIG. 5) to be performed in each concert linked to the concert list are recorded in the data base 6 together with the key data for decrypting music data recorded in the compact discs 2 and the music number data serving as the corresponding identification data every compact disc 2 thus created. The data base 6 is constructed so that the list of concerts and the list of music titles can be displayed on the basis of the data recorded in the data base 6. In addition, the music supply system 1 is set so that the home page of the list of concerts can be accessed on the basis of URL recorded on each compact disc 2.

That is, in the compact disc 2, URLs for specifying the Web server 4 and also the home page of the list of concerts are recorded and created so that the home page of the list of corresponding concerts recorded in the data base 6 can be accessed. Further, the music number data corresponding to the music number data recorded in the data base 6 are allocated every music data and recorded (FIG. 2).

Accordingly, in the music supply system 1, music pieces to be performed in each concert are recorded in compact discs 2 so that users can listen to their favorite music pieces only when the users access the server 4 and get the corresponding key data, and these compact discs 2 are distributed to users in each concert free of charge.

Accordingly, when a user wants to listen to a his/her favorite music piece performed in a concert again, the user can purchase and listen to only the favorite music piece without visiting a record shop or without knowing an album title containing the favorite music piece by merely accessing the server 4 on the basis of URL recorded on a compact disc 2 distributed in the concert to get the corresponding key data KY. Therefore, the user can easily and accurately listen to the his/her favorite music piece which the user test-listened to and liked at a concert opening place or the like.

In this case, by recording URLs on the compact disc 2 and enabling the user to not only access the server 4, but also watch the home page corresponding to the compact disc 2, a work of searching the data base 6 fully to look for a desired music piece can be simplified, and thus the desired music piece can be accurately purchased with a simple work.

Further, the music data are encrypted every file (corresponding to each music piece) and the key data corresponding to the file are set, so that the user can selectively listen to his/her desired music piece.

Further, by setting home pages, a list of concerts corresponding to a compact disc 2 is displayed and further a list of music pieces to be performed in each concert is displayed in performance order to promote a user to select his/her favorite music piece. Therefore, even when the user does not know the title of the favorite music piece, the user can get the key data for the favorite music piece on the basis of the performance order and listen to the favorite music piece.

That is, in the music supply system 1, when the compact disc 2 is loaded into the personal computer 3 (FIG. 6), the setup program recorded on the compact disc 2 is started, the server 4 is accessed on the basis of URL recorded on the compact disc 2 and further the home page of a list of concerts which corresponds to the compact disc 2 recorded in the data base 6 is accessed. In the music supply system 1, this home page is displayed (FIG. 4), and when a user selects one of the concerts in the list display which the user visited, a list of music pieces performed in this concert is displayed in the performance order by tracing the link set in the above display (FIG. 5). Further, when the user operates the purchase menu on the display to select his/her favorite music piece, the charging processing for the purchase of the music piece is executed. If the charging processing is correctly executed, in the music supply system 1, the corresponding key data KY are downloaded from the Web server 4 to the personal computer 3, the encrypted music data of the music piece selected by the user are decrypted with the key data KY and then the music data thus decrypted are downloaded into the hard disc device of the personal computer 3. Accordingly, the user can listen to the music piece at all times.

(3) Effect of Embodiment

According to the above construction, a predetermined server is accessed on the basis of an address recorded on the compact disc to issue key data for a favorite music piece from the server, and encrypted music data recorded on a compact disc are decrypted with the key data thus issued, whereby a user can easily and accurately listen to the favorite piece to which the user test-listened and took a fancy in a concert opening place or the like.

At this time, the server and the home page corresponding to the compact disc 2 are accessed on the basis of URLs which specify the server and the home page concerned, whereby the user can easily select his/her favorite music piece.

Further, the music data are encrypted every file (every music piece), and thus the operator can selectively purchase only a favorite music piece.

(4) Other Embodiments

In the above embodiment, the decrypted music data are downloaded and stored into the hard disc device. However, the present invention is not limited to this embodiment. The decryption of the music data of a favorite music piece is carried out every time the operator listens to the music piece. In this case, the encrypted music data may be stored in the hard disc device, or the music data stored on the compact disc 2 may be reproduced and decrypted every time the user listens to the music piece.

In the above embodiment, the decrypting program (the encryption releasing program) is recorded on the compact disc. However, the present invention is not limited to this embodiment. For example, the decrypting program may be downloaded together with the key data.

In the above embodiment, the key data are merely downloaded. However, the present invention is not limited to this embodiment. For example, the key data may be supplied while encrypted, and then decrypted and used at the personal computer 3 side.

Further, in the above embodiment, the music data are encrypted every music piece (which corresponds to a file). However, the present invention is not limited to this embodiment, and the music data may be encrypted every music pieces, that is, every plural files.

In the above embodiment, the home page corresponding to the compact disc is accessed to display a list of concerts, and a list of music pieces is displayed on the basis of the display of the list of concerts. However, the present invention is not limited, and a home page for promoting a music piece and purchase or non-purchase may be directly accessed on the basis of URL recorded on a compact disc. This access manner which is made with omitting a home page for a list of concerts as described above may be applied to such a case that music pieces to be performed in each concert and the performance order of the music pieces are not varied and such a case that music pieces to be performed are long in performance time such as classic music pieces and only a slight number of music pieces can be recorded on the compact disc.

In the above embodiment, the music pieces are supplied by using compact discs as information recording media. However, the present invention is not limited to this embodiment, and it is broadly applicable to various cases where various data are supplied by various information recording media such as various optical discs, memory cards serving as card type recording media each having a memory, etc.

In the above embodiment, the music pieces are supplied. However, the present invention is not limited to this embodiment. For example, the present invention may be applied to such a case that various application programs are supplied and such a case that data of a data base are supplied. In this case, the data of application programs may be encrypted every directory comprising plural files.

In the above embodiment, the music number data are recorded as identification data for identifying each music data. However, the present invention is not limited to this embodiment. For example, a file name and a directory name (holder name) may be used as identification data.

As described above, according to the present invention, a predetermined server is accessed on the basis of an address recorded on an information recording medium, key data are issued from the server and the data recorded on the information recording medium with the key data thus issued are decrypted, whereby a user can easily and accurately listen to a music piece to which the operator test-listened and took a fancy at a concert opening place or the like.

What is claimed is:

1. A method of reproducing an information recording medium, on which encrypted data are recorded, said method comprising the steps of:
    accessing a predetermined server on the basis of an address recorded in the information recording medium; and
    decrypting data recorded in the information recording medium with key data issued from said server;
    wherein the address is data for specifying said server and a home page corresponding to said information recording medium, and said method further comprises a step of accessing the home page corresponding to the information recording medium on the basis of the address to acquire the corresponding key data.

2. The information recording medium reproducing method as claimed in claim 1, wherein encrypted data are recorded on a file basis in the information recording medium, the encryption of the data is carried out so as to be decrypted every file or every plural files with the corresponding key data, and identification data for specifying each file or plural files are recorded in the information recording medium, and said method comprises a step of releasing the encryption of the corresponding file or corresponding plural files on the basis of the identification data.

3. An information recording medium in which encrypted data are recorded so that the encryption of the data is released with key data issued from a predetermined server and an address required to access said server is recorded;
    wherein the address is data for specifying said server and a home page corresponding to said information recording medium, and said method further comprises a step of accessing the home page corresponding to the information recording medium on the basis of the address to acquire the corresponding key data.

4. The information recording medium as claimed in claim 3, wherein the encrypted data are recorded every file, the encryption of the data is carried out so that the encryption can be released with the corresponding key data every file or every plural files, and identification data for specifying each file or plural files are recorded on said information recording medium.

5. A reproducing apparatus for reproducing an information recording medium on which encrypted data are recorded, said apparatus comprising:
    access means for accessing a predetermined server on the basis of an address recorded on said information recording medium; and
    decrypting means for decrypting the encrypted data recorded in said information recording medium with key data issued from said server;
    wherein the address is data for specifying said server and a home page corresponding to said information recording medium, and said method further comprises a step of accessing the home page corresponding to the information recording medium on the basis of the address to acquire the corresponding key data.

6. The reproducing apparatus as claimed in claim 5, wherein the encrypted data are recorded on a file basis in said information recording medium, the encryption is carried out so as to be decrypted every file or every plural files with the corresponding key data, and identification data for specifying each file or plural files are recorded in said information recording medium, and said apparatus releases the encryption of the corresponding file or plural files on the basis of the identification data.

7. A method of managing an information recording medium in which encrypted data are recorded;
    wherein key data for decrypting said encrypted data are issued by an access based on an address recorded in the information recording medium; and
    wherein the address is data for specifying said server and a home page corresponding to said information recording medium, and said method further comprises a step of accessing the home page corresponding to the information recording medium on the basis of the address to acquire the corresponding key data.

8. The information recording medium managing method as claimed in claim 7, wherein said method further comprises a step of issuing the corresponding key data to every home page.

9. The information recording medium managing method as claimed in claim 7, wherein the encrypted data are recorded every file in the information recording medium, and the encryption of the data is carried out so as to be released every file or plural files with the corresponding key data, and in response to a user's selecting operation, said method issues the key data corresponding to the file or plural files corresponding to the user's selecting operation.

10. The information recording medium managing method as claimed in claim 7, wherein a charging process is executed in accordance with the issuance of the key data.

* * * * *